INVENTORS
CHATLAND WHITMORE
GERALD A. RICHARDSON
BY
ATTORNEY

United States Patent Office 3,721,883
Patented Mar. 20, 1973

3,721,883
SERVO CONTROL CIRCUIT
Chatland Whitmore, Ossining, and Gerald A. Richardson, Croton-on-Hudson, N.Y., assignors to Cambridge Instrument Company, Inc., Ossining, N.Y.
Filed June 30, 1971, Ser. No. 158,213
Int. Cl. G05b 5/01
U.S. Cl. 318—615
11 Claims

ABSTRACT OF THE DISCLOSURE

Servo control circuitry for controlling the movement of a recording pen including means for amplifying an input signal to drive the recording pen to respond linearly over a wide frequency and amplitude range of the input signal and damping the movement of the recording pen to prevent oscillation thereof.

---

Figure 1:
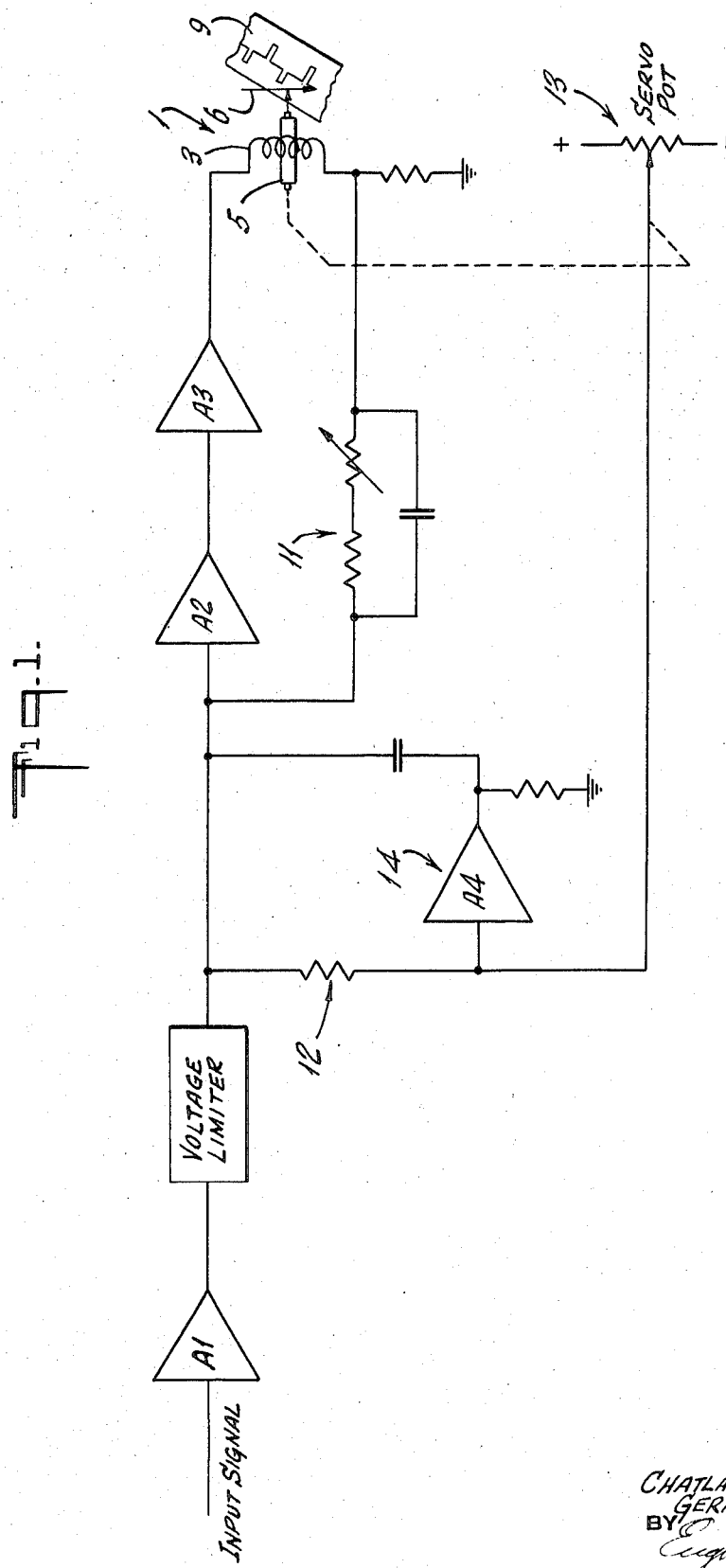

This invention relates to a servo control circuit for recording instruments and more particularly to a servo control circuit for a recording stylus magnetically driven in response to an input signal, having novel and improved feedback means for controlling the movement of the stylus so that it responds linearly over a wide range of frequencies and amplitudes of the input signal.

Certain known recording instruments such as those for producing electrocardiograms generally include an electrical circuit for the detection and amplification of electrical signals and means for recording the signals. The recording means typically uses an electromagnetic pen motor, for example, a galvanometer, which provides limited displacement of the stylus coupled to the pen motor in response to the input signal. Usually the pen motor includes spring means which returns the stylus to a neutral position when there is no input signal.

Inherent limitations of mechanical elements such as the return spring, rotor, etc., normally tends to cause the movement of the stylus to be rather erratic and slow in response to the changes in the input signal. This problem has been overcome to an extent by careful adjustment and balancing of various elements, and presently available recording instruments have been satisfactory in most applications. However, such instruments still tend to be somewhat nonlinear when the input signal fluctuates widely in frequency and amplitude. Thus, for example, when the input signal changes abruptly, as is the case of the sharp P waves of an electrocardiographic signal, the stylus generates a somewhat unstable damped oscillatory output signal.

One object of the invention resides in the provision of an improved recording instrument and more particularly a recording instrument having a faster response characteristic.

Another object of the invention resides in the provision of a recording instrument having a linear response characteristic over a wide range of variation in the frequency and voltage of the input signal.

The above and other objects of the invention are attained by providing a novel and improved feedback control circuit in the recording instrument which enables the recording stylus to respond quickly and linearly to the abrupt changes in amplitudes and frequences of the input signal.

Another feature of the invention resides in the provision of an improved feedback control circuit which minimizes oscillation or over-shoot of the writing stylus upon being displaced in response to the input signal.

The above and other objects, features and advantages of the invention will become more apparent from the following detailed description and accompanying drawings forming part of this application.

Figure 2:
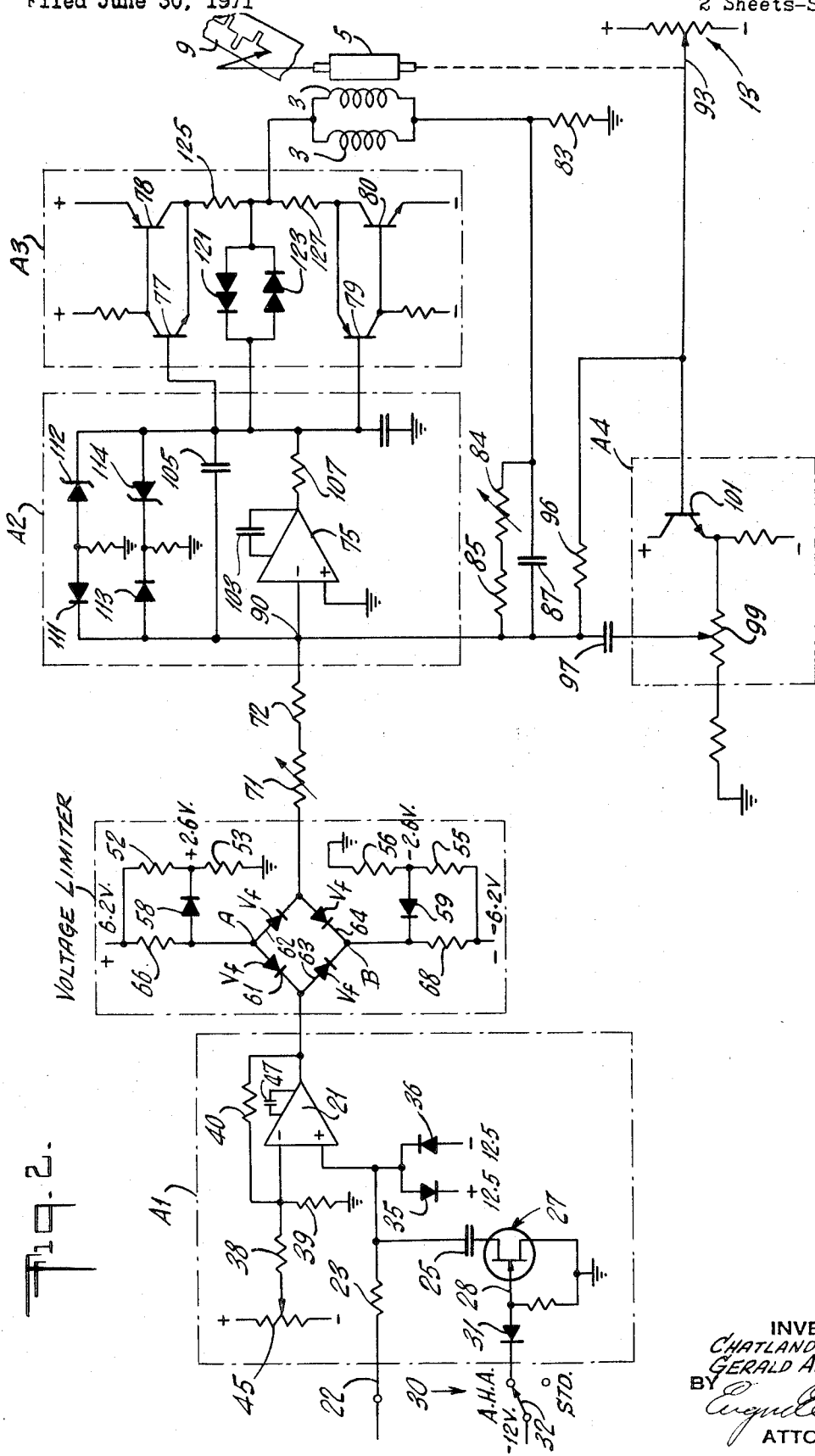

In the drawings:

FIG. 1 is a schematic block diagram of the servo control circuit in accordance with the invention; and FIG. 2 is a detailed schematic drawing of the servo control circuit of the invention in FIG. 1.

Generally, as shown in FIG. 1, the servo control circuitry of the invention includes a plurality of amplifiers A1, A2, and A3 connected in series for amplifying the input signal to provide an output having a suitable amplitude for driving the pen motor 1. Where necessary, the control circuit may include a voltage limiter to limit the maximum power applied to the motor so that the drive signal applied to the motor does not exceed the power handling capability thereof. As shown schematically in FIG. 1, the pen motor 1 includes a galvanometer having a coil 3 and a rotor 5. The rotor 5 is inductively coupled to the coil so that the input current flowing through the coil drives the stylus 6 to record the signal on the recording paper 9.

Broadly stated, the control circuitry encompasses a first feedback circuit 11 connected between the coil 3 and the input to the amplifier A2 for providing a dynamic current feedback, a second feedback circuit 12 connected between a potentiometer 13 driven by the rotor 5 and the input to the amlifier A2 for providing a stylus position feedback signal, a third feedback circuit 14 for deriving an AC feedback signal from the position feedback signal and applying it to the input of the amplifier A2.

The pen motor does not utilize the return spring and instead relies on a suitable voltage positioning circuit for returning the writing stylus to a neutral position. Use of the improved feedback control circuits and elimination of the return spring causes the writing stylus to respond substantially linearly over a wide range of fluctuations in the amplitude and frequency of the input signal.

FIG. 2 of the drawings shows in detail an illustrative embodiment of the invention in the form of a control circuit of electrocardiographic apparatus. The control circuit includes an input amplifier stage A1 which amplifies the input signal to a certain level before it is applied to an input of another amplifier stage A2 driving the pen motor. The voltage limiter is interposed between the two amplifiers to limit the voltage applied to the second amplifier stage A2 so that the latter is prevented from applying excessive amount of current to the pen motor and thereby destroy or adversely affect its response characteristics.

More specifically and referring to FIG. 2, the first amplifier stage A1 includes a conventional monolithic operational amplifier 21. The positive input terminal of the operational amplifier 21 is connected to the input signal source 22 through a resistor 23 which in combination with a capacitor 25 forms a low pass RC filter with a minus 3 decibel loss at 40 Hz. A field effect transistor (FET) 27 is connected in the manner shown to function as a switch in series with the capacitor 25. The gate electrode 28 of the FET 27 is connected to a response switch 30 via a diode 31. The circuit is so adapted that when the contact arm 32 of the switch 30 is moved to a position designated Std., the gate 28 of the FET 27 opens, and this enables the FET to conduct and thereby effectively ground the capacitor 25. When the arm 32 is moved to another position designated A.H.A., minus 12 volts is applied to the gate 28, and this turns off the FET 27 and opens the ground return for the capacitor 25 and thereby disables the filter. The diode 31 isolates the FET 27 from other circuits connected to the switch 30. A.H.A. designates a specific frequency response established by the American Heart Association so that when the contact arm is moved to the A.H.A. position to turn off the FET 27, the control circuit operates in the specific A.H.A. mode. Diode pairs 35 and 36 connected in the manner shown limit the voltage applied to the positive input terminal of the operation amplifier 21 to 13 volts.

The resistors 38, 39, and 40 connected in the manner shown provide a feedback control to set the gain of the amplifier stage A1 at about 2.5. The resistor 38 is connected to the wiper arm 43 of the potentiometer forming part of a center control circuit for setting the input DC level of the amplifier 21 at a certain level for centering the stylus 6 intermediate the recording strip 9. Through the use of a high value resistor 38, the centering voltage has a negligible effect on the gain of the operational amplifier 21.

The operational amplifier 21 is provided with a feedback capacitor 47 on a magnitude that will impart a high frequency roll-off characteristic to the amplifier 21 so that the amplifier will have a broadband response characteristic.

The voltage limiter 51 is of a conventional design which limits the output voltage to within a certain range, for example within ±2.6 volts. The limiter includes resistors 52 and 53, 55 and 56, and diodes 58 and 59 connected to act as limiters of ±DC voltages applied to network of diodes 61–64. The forward voltage-drops across the diodes 58 and 59 when they conduct add to the limiting voltage. This enables the diodes 61 and 63 to add compensating voltages $V_f$ to the input signal level. The actual limiting occurs at the junctions A and B. The diode 58 conducts when the voltage at the junction reaches $(V_f+2.6)$ volts. The diode 59 conducts when B reaches $-(V_f+2.6)$ volts. The diodes 62 and 64 subtract a voltage $V_f$ from the levels at the junctions A and B, so that the limiter output voltage is the same as the input voltage within the limits of ±2.6 volts. The diodes 61–64 are forward biased by their connections to the ±6.2 volts supplied through the resistors 66 and 68 as shown.

Before application to the input of the next amplifier stage A2 the output of the limiter may be adjusted to within a certain range to set the movement of the stylus at a certain predetermined ratio to the amplitude of the voltage, for example 1 volt/cm. This is readily accomplished by using an adjustable resistor 71 in series with a fixed resistor 72 connected in series with the output of the voltage limiter 51.

The output so modified is then applied to an inverting amplifier stage A2, the output of which is applied to drive a unity gain power amplifier stage A3. The inverting amplifier stage may include an inverting operational amplifier 75 which provides a selected voltage gain. The unity power gain amplifier comprises transistors 77–80 arranged in the configuration shown to form a unity-gain "totem pole" power amplifier, driven by the output of the operational amplifier 75. The power amplifier output drives the pen motor coils 3 which are returned to ground through a resistor 83 of very low impedance value. The voltage drop across the resistor 83 is proportional to the current through the pen motor coils and is fed back through adjustable and fixed resistors 84 and 85 shunted by a capacitor 87, to a summing junction 90 which constitutes the input to the amplifier 75. The adjustable resistor 84 determines the loop current gain. The capacitor 87 compensates for the high frequency effects of the pen motor inductance. Since the pen motor does not have a return spring, a drive current is not present except when the rotor 5 is in motion, thereby making the current feedback dynamic.

A static position feedback signal is taken from the wiper arm 93 of the potentiometer 13 mechanically linked to the pen motor rotor 5, and applied to the summing junction 90 through a resistor 96. This provides a feedback signal in the form of varying voltages established by the rotor 5. The damping signal is derived from the AC component of the position feedback voltage and is coupled to the summing junction 90 through a capacitor 97. The feedback circuitry for deriving the damping signal includes a potentiometer 99 which sets the damping level and a transistor 101 arranged in the emitter-follower (or common collector) configuration A4 as shown to avoid loading the potentiometer 13.

Frequency compensation for the control loop is provided by a feedback capacitor 103 of the operational amplifier 75 and another capacitor 105 in shunt with the inverting amplifier stage A2.

The inverting amplifier stage also includes voltage limiting diodes 111–114 connected in the manner shown in shunt therewith to limit the output voltage and thereby prevent the amplifier 75 from saturating. Otherwise the feedback loop would open and generate violent recovery transients and cause erratic movement of the pen motor. The diodes 112 and 114 are 9.1 volts Zener diodes and essentially function as the limiters. The diodes 111 and 113 are added in series to prevent the relatively high capacitance of the diodes 112 and 114 from upsetting the frequency compensation.

The "totem pole" current amplifying stage A3 includes a parallel network of diodes 121 and 123 which provide certain forward voltage drops thereacross to establish reference voltages to the transistor pairs 77 and 78 and 79 and 81 and thereby limit their output currents. Thus the sum of the voltage drop across base-emitter of the transistor 77 and the resistor 125 is limited to the forward voltage drop of the diode 121. This limiting prevents positive output current from exceeding approximately 600 milliamperes. The diode 123 and the resistor 127 function similarly to limit the negative output current to −600 milliamperes. The current-limiting is necessary because a drive signal much in excess of 600 milliamperes tends to demagnetize the particular type of pen motor used and reduce its sensitivity.

The various feedback circuits and voltage limiting diode networks described above provide a highly stable feedback control that enables the writing stylus to respond linearly over a wide range of fluctuations in amplitude and frequency of the input signal. Thus, for example, with various elements of the control circuit shown in FIG. 2 adjusted to suitable values, the frequency response of the stylus is substantially linear even up to 150 to 200 Hz., which is a marked improvement in electrocardiographic instruments. This advantageous feature can be demonstrated by the fact that a square wave can be faithfully reproduced.

While the control circuitry has been discussed in terms of the parameters of the circuitry used in an electrocardiographic apparatus, the principles of the invention are obviously not so limited but applicable to the control circuitry of any apparatus designed to control writing styluses so that the outut produced by them represent a faithful represenation of the input signals over a wide range of frequencies and amplitudes.

What is claimed is:

1. A servo control circuit for controlling the movement of an unrestrained writing element of a recording device in response to an input signal comprising recording means including a drive coil, means for providing amplification of the input signal and producing a drive current, connections between the amplification means and said drive coil for feeding the drive current thereto and feedback control circuitry for applying feedback signals derived from the drive current flowing through the drive coil and the position of the writing element for causing the recording means to respond linearly over a wide range of fluctuation in frequency and amplitude of the input signal.

2. A servo control circuit for controlling the movement of an unrestrained writing element of a recording device in response to an input signal comprising means for providing amplification of the input signal, and feedback control circuitry for applying feedback signals derived from the drive current of the recording means and the position of the writing element for causing the recording means to respond linearly over a wide range of fluctuation in frequency and amplitude of the input signal, said recording means including a galvanometer having a rotor, a stylus driven by the rotor and an inductive coil energized by the input signal for inductively driving the rotor, said feedback circuitry including a first feedback loop for applying the drive current from the inductive coil to the input of the amplifying means to provide dynamic current feedback, a second feedback loop for providing a feedback voltage to the input of the amplifying means representing the relative position of said stylus, and a third feedback loop for applying an AC derivative of said feedback voltage to the input of said amplifying means for providing a damping signal.

3. A servo control circuit according to claim 2 wherein said feedback loop includes variable resistive impedance for adjusting the amplitude of the current being fed back and a capacitive impedance in shunt with the resistive impedance for compensating for the high frequency effects of the inductance of said coil.

4. A servo control circuit according to claim 2 wherein said second feedback loop includes a potentiometer having a wiper arm, means mechanically coupling the wiper arm to the rotor of the recording means and resistive means for applying the voltage present at the wiper arm to the input of the amplifying means.

5. A servo control circuit according to claim 2 wherein said third feedback loop includes a network including an RC circuit for deriving an AC derivative feedback signal from the voltage present at said wiper arm.

6. A servo control circuit according to claim 5 wherein said network includes a transistor amplifier stage arranged in an emitter follower (or common collector) and interposed between said RC circuit and said wiper arm to prevent overloading of said potentiometer.

7. A servo control circuit according to claim 2 including means for centering the stylus and means for limiting the amplitude of the signal from the input source to a predetermined level before it is applied to the said amplification means.

8. A servo control circuit according to claim 7 wherein said amplifying means includes a voltage amplifier stage and a unity-gain power amplifier stage connected in series therewith.

9. A servo control circuit according to claim 8 wherein said voltage amplifier stage includes an inverting operational amplifier, a diode network in shunt with the inverting amplifier for limiting the output voltage thereof to prevent its saturation, and capacitive means in shunt with said operational amplifier for compensating the high frequency effects of the feedback signals.

10. A servo control circuit according to claim 8 wherein said unity-gain power amplifier stage includes means for limiting the output current thereof within a predetermined range.

11. A servo control circuit according to claim 8 wherein said unity-gain power amplifier stage includes a plurality of transistors arranged in an unity-gain mode and diode elements connected to provide a reference voltage across said transistors.

References Cited

UNITED STATES PATENTS

| | | | |
|---|---|---|---|
| 2,913,649 | 11/1959 | McKenney et al. | 318—616 X |
| 2,506,648 | 5/1950 | Niemann et al. | 324—100 X |
| 2,855,551 | 10/1958 | McCarty | 318—653 X |
| 3,340,536 | 9/1967 | Sauber | 324—100 X |
| 3,497,779 | 2/1970 | Eisele | 318—616 X |

BENJAMIN DOBECK, Primary Examiner

U.S. Cl. X.R.

318—653, 686